Fig. 1.

Oct. 2, 1956    R. L. TRIMBLE    2,765,027
METERING APPARATUS
Filed March 25, 1952    5 Sheets-Sheet 3

INVENTOR
Roy L. Trimble
BY
Thiess, Olson + Mecklenburger
ATTORNEYS

Oct. 2, 1956            R. L. TRIMBLE            2,765,027

METERING APPARATUS

Filed March 25, 1952            5 Sheets-Sheet 4

INVENTOR
Roy L. Trimble.
BY
Thiess, Olsen & Mecklenburger.
ATTORNEYS.

United States Patent Office 2,765,027
Patented Oct. 2, 1956

2,765,027

METERING APPARATUS

Roy L. Trimble, Bloomington, Ill., assignor to
W. W. Williams, Bloomington, Ill.

Application March 25, 1952, Serial No. 278,324

12 Claims. (Cl. 158—36.3)

This invention relates to metering apparatus, and more particularly to apparatus for metering liquids at a relatively low rate of flow. It is an object of the invention to provide improved apparatus of that character.

In many instances in various arts, it is desired that a liquid be supplied at a very low rate but in a regular, controllable stream. One such instance is in the feeding of fuel oil to a burner, particularly in a small burner such as that used in homes. The invention is described in connection with such an application but it is to be understood that the invention is not limited thereto.

It is another object of the invention to provide improved fuel oil metering apparatus.

It is another object of the invention to provide improved liquid metering apparatus in which the rate of metering may be readily adjusted over a substantial range.

It is another object of the invention to provide an improved fuel oil metering device in which the flow of oil and of primary air may be readily adjusted over substantial ranges by a single control device.

It is another object of the invention to provide improved fuel oil metering apparatus in which an oil metering device is driven by the pressure of the primary air supply.

It is another object of the invention to provide improved fuel oil metering apparatus in which a single pump supplies both primary and secondary air and drives a fuel oil metering device.

It is another object of the invention to provide improved fuel oil metering apparatus in which the flow of oil, of primary air, and of secondary air may be readily adjusted over substantial ranges by a single control device.

This invention, together with further objects and advantages thereof, will best be understood by reference to the following description taken in connection with the accompanying drawings, and its scope will be pointed out in the appended claims.

In the drawings, in which like parts are designated by like reference numerals.

As indicated above the embodiments of the invention disclosed in the drawings are specifically intended for the metering of fuel oil to a burner and are particularly adapted to the metering of fuel oil at a low rate of flow, as for example in a domestic burner. The embodiment of the invention disclosed in Fig. 1 employs separate sources of primary air and secondary air. As is well understood in the art, primary air is that air which is mixed with the fuel prior to burning and sprays the fuel forcefully into the burning chamber, while secondary air is that air which is mixed with the fuel and the primary air in the burning chamber. The primary air must inherently be delivered at relatively high pressure although in relatively small quantity, since its purpose is to break up and preferably atomize the fuel as it carries the fuel into the burning chamber, while the secondary air may be delivered at relatively low pressure but in relatively large quantity. It is for this reason that two separate sources are conventionally used, as in the embodiment of the invention illustrated in Fig. 1.

Figure 1:
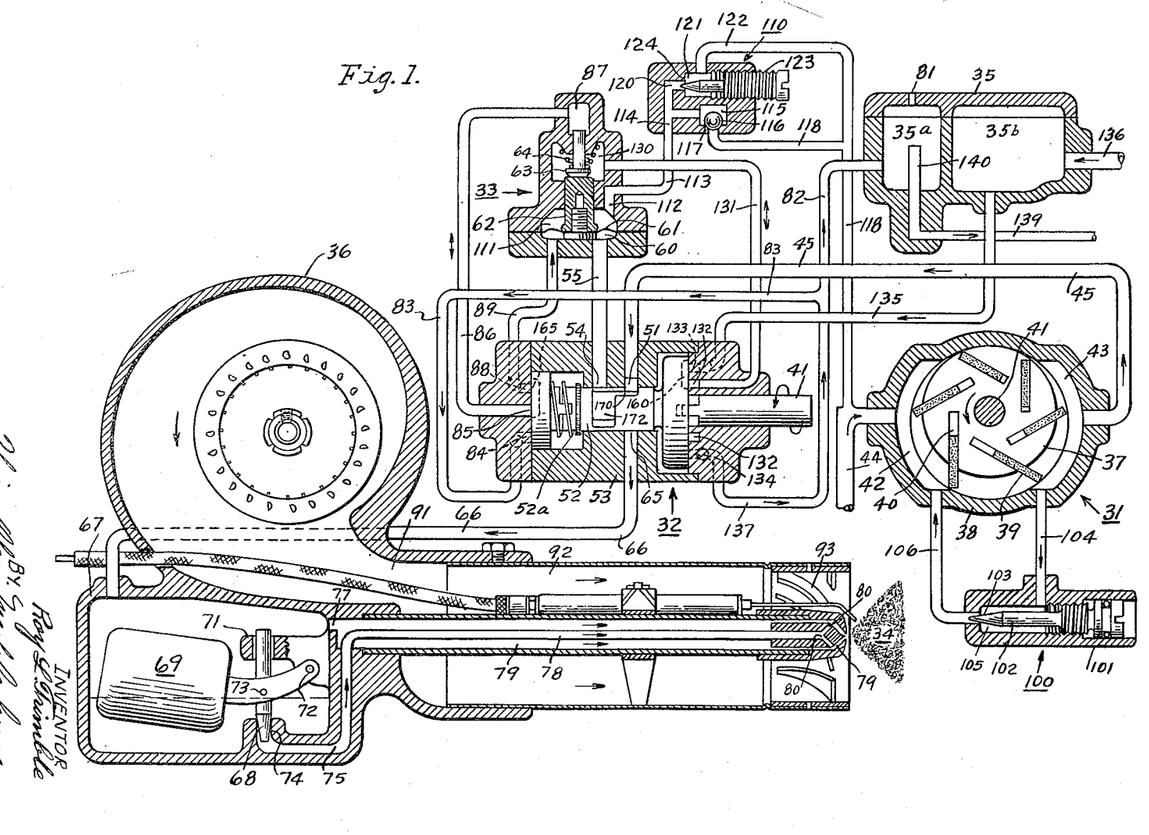
Fig. 1 is a schematic diagram, largely in cross section, illustrating one embodiment of the invention.

The apparatus illustrated in Fig. 1 includes a source 31 of primary air which may be a positive displacement pump as illustrated. The pump 31 delivers air at relatively high pressure through a continuously driven valve mechanism 32 to a reciprocating pump or metering device 33 which is driven by this air from the pump 31. The air is alternately expelled from the metering device 33 through the valve mechanism 32 and eventually reaches a burning chamber 34.

Liquid fuel, for example oil, is pumped by the metering device 33 from a receiver or oil supply chamber 35a of a receiver and strainer unit 35 through the valve mechanism 32 to the metering device. The oil is alternately expelled from the metering device 33 to pass again through the valve mechanism 32 and eventually reaches the burning chamber 34.

A source of secondary air 36, which is preferably a centrifugal fan, delivers secondary air to the burning chamber 34 at which point it is mixed with the fuel oil and primary air.

The air pump 31 may be of conventional design, as illustrated. This pump includes a rotor 37, a housing 38, and a plurality of blades 39 which are slidably mounted in corresponding slots 40 in the rotor 37. The housing 38 provides a cylindrical chamber within which the rotor 37 is mounted for rotation about a shaft 41 which is eccentric with respect to said cylindrical chamber. The blades 39 are urged resiliently outward of the slots 40 by any suitable means such as springs, not shown in the drawings, whereby the outward edges of the blades tend to follow the cylindrical inner surface of the housing 38 and hence tend to advance air in a counterclockwise direction as the apparatus is viewed in Fig. 1. Since the rotor is eccentric with respect to the cylindrical inner wall of the housing, it will tend to withdraw air from an inlet port 42 and expel the air into an outlet port 43, all as is well understood in the art.

The inlet port 42 is connected to the atmosphere by a conduit 44, preferably through a filter not disclosed in the drawings. Another conduit 45 which is connected to the outlet port 43 carries air from the outlet port to a port 51 in the valve mechanism 32.

The valve mechanism illustrated is of the rotating type, having a rotor 52 and a housing 53. The rotor 52 is preferably formed in two parts which are keyed together intermediate the ends of the rotor as suggested in Fig. 1, the two parts being urged axially apart by a spring 52a in order that the ends of the rotor may be pressed resiliently against the facing ends of the housing 53. Axial movement of the whole rotor with respect to the air pump 31 is also permitted by a keyed interruption of the shaft 41 intermediate the air pump and the valve mechanism, also as shown in Fig. 1. The rotor may be driven by any suitable means but in the interest of simplicity is preferably driven with the pump 31 and is shown in the drawings driven by the pump shaft 41.

The port 51 of the valve mechanism is connected through 90 degrees of each rotation of the valve rotor 52 to another port 54 which is connected by a conduit 55 to an expansible chamber 60 in the metering device 33. The detailed construction of the valve mechanism 32 which effects this and other intermittent connection of parts will be described following the explanation of operation of the over-all apparatus.

The expansible chamber 60 is formed by the body of the metering device and a flexible diaphragm 61. When the port 51 of the rotary valve is so connected to the port 54, air from the pump 31 will enter the expansible chamber 60 forcing the flexible diaphragm 61 upwardly. This movement of the diaphragm forces a piston 62 upwardly, along with a second piston 63, against the action of a spring 64 which urges the piston 63 downwardly against the upper end of the piston 62.

During a later portion of each cycle of the rotary valve 32 the ports 51 and 54 thereof are connected to a third port 65, this interconnection of the three ports 51, 54 and 65 continuing over 180 degrees of rotation of the valve rotor 52. During this period the air contained within the expansible chamber 60 along with fuel oil which has been added thereto in metered quantities, as will subsequently be explained, is expelled from the chamber 60 by the spring 64 and passes into the port 65 along with a continuous flow of air from the pump 31 and the port 51.

A conduit 66 connected to the port 65 carries off the mixture of air and fuel oil and delivers the mixture to a float chamber 67. The fuel oil forms a pool at the bottom of the float chamber and the flow of oil out of the float chamber is controlled by a valve 68 which is under the influence of a float 69. As will be readily apparent in Fig. 1 the stem of the valve 68 is slidably supported in a vertical position by a guide 71, while the float 69 is pivotally connected at 72 to the housing of the float chamber 67 and pivotally connected at 73 to the stem of the valve 68.

When the oil in the float chamber is sufficiently high, the float 69 lifts the valve 68 from its seat 74 and permits oil to flow out of the float chamber through a passage 75, the pressure of the primary air in the float chamber expelling the oil forcibly. The primary air is permitted to escape from the float chamber through a passage 77 but is sufficiently restricted that a substantial air pressure is maintained in the float chamber to expel the fuel oil.

The fuel oil passes from the passage 75 into a conduit 78 while the primary air enters a chamber 79 which surrounds the pipe 78. At the right-hand end of this pipe the oil emerges through ports 80 into the air passage 79 and is carried by the air stream into the burning chamber 34.

As previously indicated oil is supplied to the metering device 33 and to the burning chamber 34 from a receiver 35a, which is preferably vented, as at 81. The receiver contains a supply of fuel oil which may be drawn off through a conduit 82, and may, for example, be a large supply tank, although in the illustrated embodiment it is a small chamber which is constantly replenished with fuel oil.

The conduit 82 leads into another conduit 83 which in turn leads to a port 84 in the valve mechanism 32. The port 84 is connected intermittently by the valve rotor 52 to a port 85 to which there is connected another conduit 86. This conduit leads to an expansible chamber 87 which is the uppermost chamber of the metering device 33.

The sequence of operation of the valve mechanism 32 is such that the valve rotor 52 connects the ports 84 and 85 during the time that the piston 63 of the metering device is moving downwardly under the influence of the spring 54, with the result that oil is drawn into the expansible chamber 87 from the receiver 35a through the conduits 82 and 83, the valve mechanism 32, and the conduit 86.

When the piston 63 of the metering device is driven upwardly by primary air entering the expansible chamber 60, the conduit 86 and the port 85 are no longer connected to the port 84 but instead are connected to another port 88. A conduit 89 connects this port to the expansible chamber 60 whereby upward movement of the piston 63 drives oil from the chamber 87 through the conduit 86, the valve mechanism 32, and the conduit 89 into the chamber 60. It is through this means that oil is made available in the chamber 60 to be expelled subsequently, with the primary air contained in the same chamber, through the conduit 55, the valve mechanism 32, and the conduit 66 into the float chamber 67, as previously described. It will be readily understood by those skilled in the art that the flow of oil from the chamber 87 to the chamber 60, when air is pumped into the chamber 60, is obtained by virtue of the fact that the displacement effected in chamber 87 is less than the displacement effected in chamber 60 for any given movement of the diaphragm 61 and pistons 62 and 63.

The centrifugal air pump 36 for supplying secondary air is preferably driven by a separate source of power from that employed for driving the pump 31 and the valve mechanism 32, since it inherently rotates at a substantially higher speed than the valve mechanism and the primary air pump. The centrifugal air pump may be of conventional design and expels air through an outlet 91 into a chamber 92 which surrounds the primary air chamber 79. The secondary air preferably passes over deflecting vanes 93 which direct the secondary air into the burning chamber 34 in a vortex in order to facilitate mixing of the secondary air with the fuel oil and primary air.

The invention as so far described, certain portions of which will subsequently be described in greater detail, provides an accurate metering device which can meter fuel oil or other liquids in very small amounts. Furthermore, in the application to which the illustrated embodiment of the invention is adapted, the metering device is driven by air from the source of primary air and hence requires no separate source of driving power.

Control apparatus is provided for determining the rate of flow of primary air and fuel oil to the burner, this apparatus consisting primarily of a bleeder valve 100 which permits restricted passage of air from the outlet port 43 of the air pump 31 to the inlet port 42. This valve comprises a body portion 101, a needle valve 102 threadedly engaged with the body member, and a valve seat 103. A conduit 104 leads from the outlet port 43 of the air pump to a chamber 105 within the body 101 of the bleeder valve, and a conduit 106 opens into the valve seat 103 and leads to the inlet port 42 of the air pump 31. As will be apparent upon examination of Fig. 1, the flow of air from the outlet port 43 through the conduit 104, the chamber 105 and the conduit 106 into the inlet port 42 of the air pump, is adjustably restricted by the needle valve 102. The latter is readily adjustable by virtue of its threaded engagement with the valve body 101 to vary this flow of air and thereby to control the output of the air pump 31.

The control apparatus 100 is capable of varying the flow of primary air and the flow of fuel oil to the burning chamber, while maintaining a substantially constant ratio of oil and air delivered. It will be apparent that by controlling the amount of air bled from the outlet port of the pump 31 to the inlet port thereof, the control apparatus 100 may control the flow of primary air to the burning chamber. The flow of oil is controlled by the same means and substantially in proportion since the amount of oil metered by the metering device 33 during each cycle of operation is a substantially linear function of the amount of primary air pumped into the expansible chamber 60 during each cycle of operation. Accordingly, if the output of the air pump 31 were, for example, reduced by opening the needle valve 102, the amount of air entering the expansible chamber 60 of the needling device during each cycle would be reduced, and the amount of oil drawn into the expansible chamber 87 of the metering device during each cycle would also be reduced by substantially the same ratio.

In accordance with this feature of the invention, then, a single control device 100 may be used to adjust the flow of primary air and to adjust the flow of oil in substantially the same proportion, whereby the ratio of oil to primary air remains substantially constant. The convenience of such a single control device, which does not alter appreciably the ratio of fuel to primary air, is believed to be apparent.

A separate control device 110 is employed for adjusting the ratio of oil to primary air as supplied to the burning chamber 34. Referring briefly to the metering device 33, it will be seen that there is a third expansible chamber 111 immediately above the diaphragm 61 which constitutes the upper wall of the expansible chamber 60. The chamber 111 and the chamber 60 in combination constitute a single cavity in the body of the metering device 33, this cavity being divided into the two chambers 111 and 60 by the diaphragm 61. It will be apparent that as air enters and expands the chamber 60, the chamber 111 must contract, and as air is expelled from the chamber 60 contracting the latter, the chamber 111 must expand.

The chamber 111 is normally filled with air which may move into and out of the chamber through a passage 112. This passage leads into a conduit 113 which in turn leads into a passage 114 in the body of the control device 110, previously referred to. The passage 114 leads into a recess 115 in which there is located a ball valve comprising a ball 116 and a valve seat 117. Below the valve seat 117 and opening thereinto is a conduit 118 which leads to the atmosphere, and in the particular embodiment disclosed, into the inlet conduit 44 of the air pump 31.

It will be readily understood that the ball 116 will permit ready flow of air from the conduit 118 to the passage 114 and hence to the expansible chamber 111 of the metering device 33, but that it will prevent the flow of air in the opposite direction.

Another passage 120 in the control device 110 branches off the passage 114 and leads to a chamber 121. The latter chamber is connected by a conduit 122 which leads into the conduit 118 and hence to the atmosphere. Within the chamber 121 is a needle valve 123 which threadedly engages the body of the control apparatus 110 and which cooperates with a valve seat 124 to restrict the flow of air in either direction between the passage 120 and the conduit 122.

It will now be apparent that when primary air enters the expansible chamber 60 of the metering device the diaphragm 61 tends to rise and force air out of the expansible chamber 111 and through the conduit 113 to the control device 110. This flow of air is prevented from passing into the conduit 118 by the ball 116 but may pass through the needle valve into the chamber 121 and through the conduits 112 and 118 to the atmosphere. The outward flow of air from the expansible chamber 111 of the metering device is thereby adjustably restricted by the needle valve 123.

Accordingly, the displacement of the diaphragm 61 and hence the movement of the piston 62 and the piston 63 is dependent upon the setting of the needle valve 123, assuming that the pressure of the primary air and the duration of the connection of the air pump 31 to the expansible chamber 60 are fixed. Since the needle valve 123 may so control the stroke of the piston 63, it consequently controls the amount of fuel oil which is metered during each cycle of operation.

The principal portion of the primary air which is supplied to the burning chamber 34 is fed directly from the valve port 51 to the valve port 65 as will subsequently be explained in a detailed description of the valve mechanism 32. Accordingly, any change in the flow of primary air into the expansible chamber 60 during the period of time in which the air pump is connected to the chamber 60 will be of no substantial significance as compared to the total flow of primary air over a complete cycle of operation. The control apparatus 110 is therefore capable of materially alternating the quantity of oil metered during each cycle of operation while having a relatively minor effect upon the total flow of primary air during each cycle. Accordingly, the control device 110 is effective to adjust the ratio of fuel to primary air as supplied to the burning chamber 34.

As has previously been mentioned the ball 116 of the control device 110 permits a relatively free flow of air into the chamber 111 of the metering device. The diaphragm 61 may therefore readily move downwardly under the influence of the spring 64 and expel the air and fuel oil contained in the chamber 60 of the metering device during that portion of the cycle in which the chamber 60 is connected to the valve port 65 and through the conduit 66 of the flow chamber 67.

According to the embodiment of the invention illustrated in Fig. 1 additional apparatus is provided for pumping oil into the receiver 35a against a substantial head, as for example when the main supply tank, not shown in the drawings, is located below the level of the metering device or at a substantial distance therefrom. For this purpose still another expansible chamber 130 is provided in the metering device 33, this chamber being connected by a conduit 131 to a port 132 in the valve mechanism 32. The port 132 is alternately connected to ports 133 and 134, the former being connected by a conduit 135 to an oil strainer chamber 35b of the receiver and strainer unit 35 and to an oil supply line 136. The valve port 134 is connected by a conduit 137 and the previously mentioned conduit 82 to the receiver 35a.

Referring again to the metering device 63 it will be seen that the piston 62 has a larger horizontal cross section than the piston 63. Accordingly, as primary air enters the chamber 60 and drives the pistons 62 and 63 upwardly oil is driven out of the chamber 130 through the conduit 131 to the valve port 132. During this portion of the cycle the port 132 is connected to the port 134 whereby oil flows through these ports and through the conduits 137 and 82 into the receiver 35a. When the pistons 62 and 63 of the metering device are allowed to move downwardly under the influence of gravity and the spring 64 the chamber 131 expands and tends to draw oil thereinto through the conduit 131. During this portion of the cycle the valve port 132 is connected to the port 133 whereby oil is drawn through the supply line 136 through the strainer chamber 35b and the conduit 135, through the ports 133 and 132 and the conduit 131 into the chamber 130. By this means oil may be drawn from a remote main supply into the receiver 35a where it is readily available to the metering device without the necessity of operating against a substantial and perhaps variable head.

The oil pumped from the remote supply to the receiver 35a is preferably somewhat in excess of that demanded by the metering device in order to insure a constant supply. The excess oil may flow back to the remote main supply through a conduit 139 whenever the level in the receiver 35a rises above the upper end of a stand pipe 140. The conduit 82 which opens into the side of the receiver 35a and which carries oil to the metering device must, of course, be located below the oil level in the receiver and hence below the upper end of the stand pipe 140.

The oil supply pump, comprising primarily the expansible chamber 130 and the right-hand portion of the valve mechanism 32, is not an essential feature of the invention in its broader aspects since the main oil supply may be located adjacent the metering apparatus or even above it. It will be readily understood that the metering pump itself, consisting primarily of the expansible chamber 87 and the left-hand portion of the valve mechanism, is capable of pumping oil against a substantial pressure. Metering will be more accurate, however, if the metering pump is not required to pump oil against too large a head.

The oil supply pump will be seen to cooperate in a novel manner with the basic invention, however, in that the expansible chamber 130 is made an integral part of the metering device, and the controls therefore are made an integral part of the principal valve mechanism. This arrangement, in addition to being a simplified construction, assures that oil is supplied in a fixed ratio to the metered oil. The ratio will remain constant in spite of variables such as speed of rotation of air pump and valve mechanism, and length of stroke of the metering device. Accordingly, the supply pump may be set up to deliver only a slightly smaller amount than is required by the metering pump.

Figures 2, 3, 4, 5:
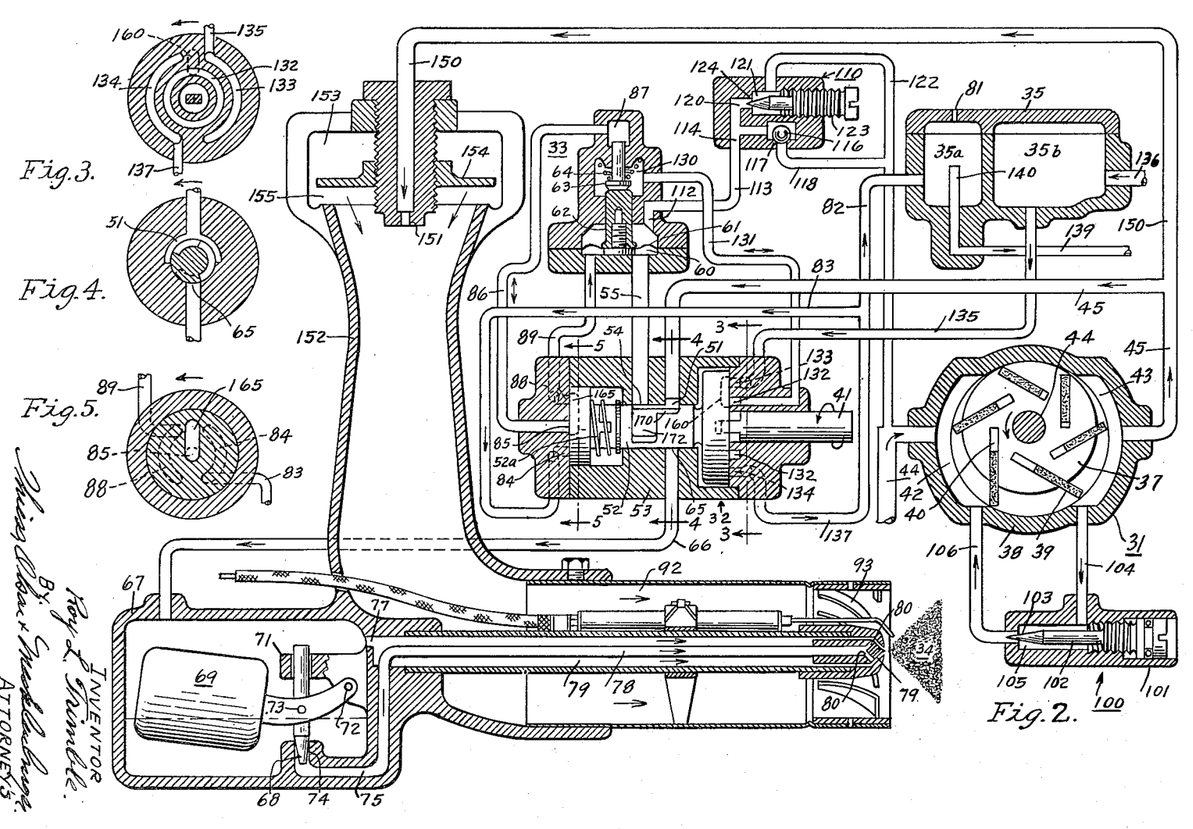
Fig. 2 is a similar diagram illustrating another embodiment of the invention.
Fig. 3 is a partial, cross-sectional view of apparatus common to Figs. 1 and 2, taken along the line 3—3 of Fig. 2.
Fig. 4 is a similar cross-sectional view taken along the line 4—4 of Fig. 2.
Fig. 5 is a similar cross-sectional view taken along the line 5—5 of Fig. 2.
Figure 6:
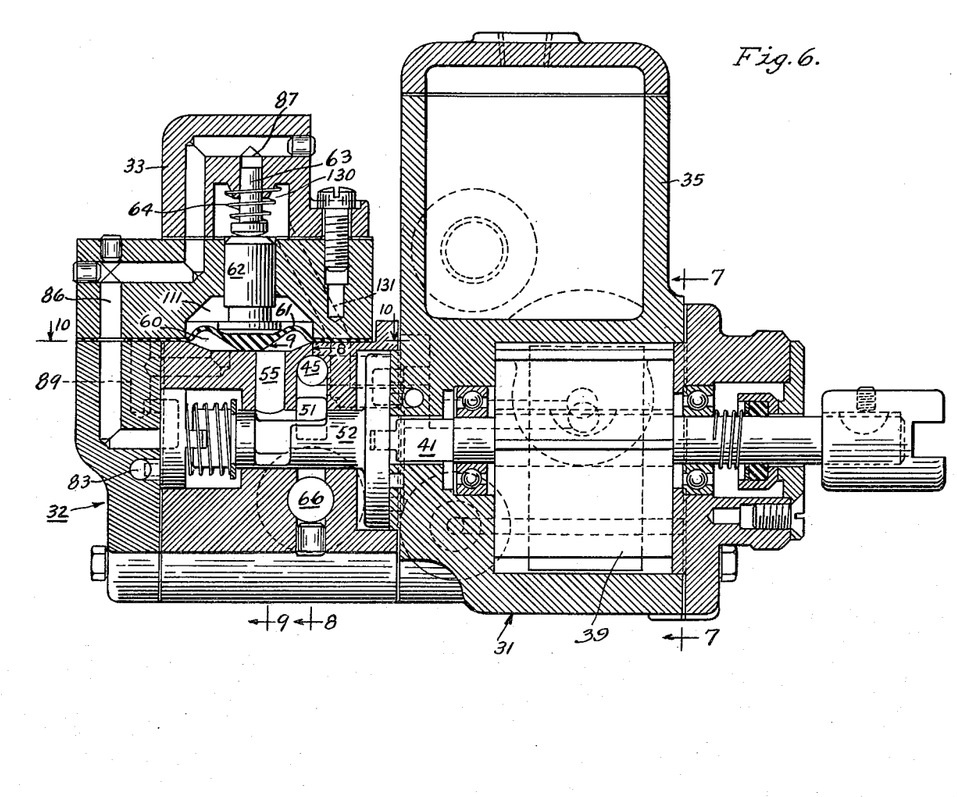
Fig. 6 is an enlarged cross-sectional view of apparatus common to Figs. 1 and 2, showing an actual construction embodying various features of the invention.
Figures 7, 8, 9, 10:
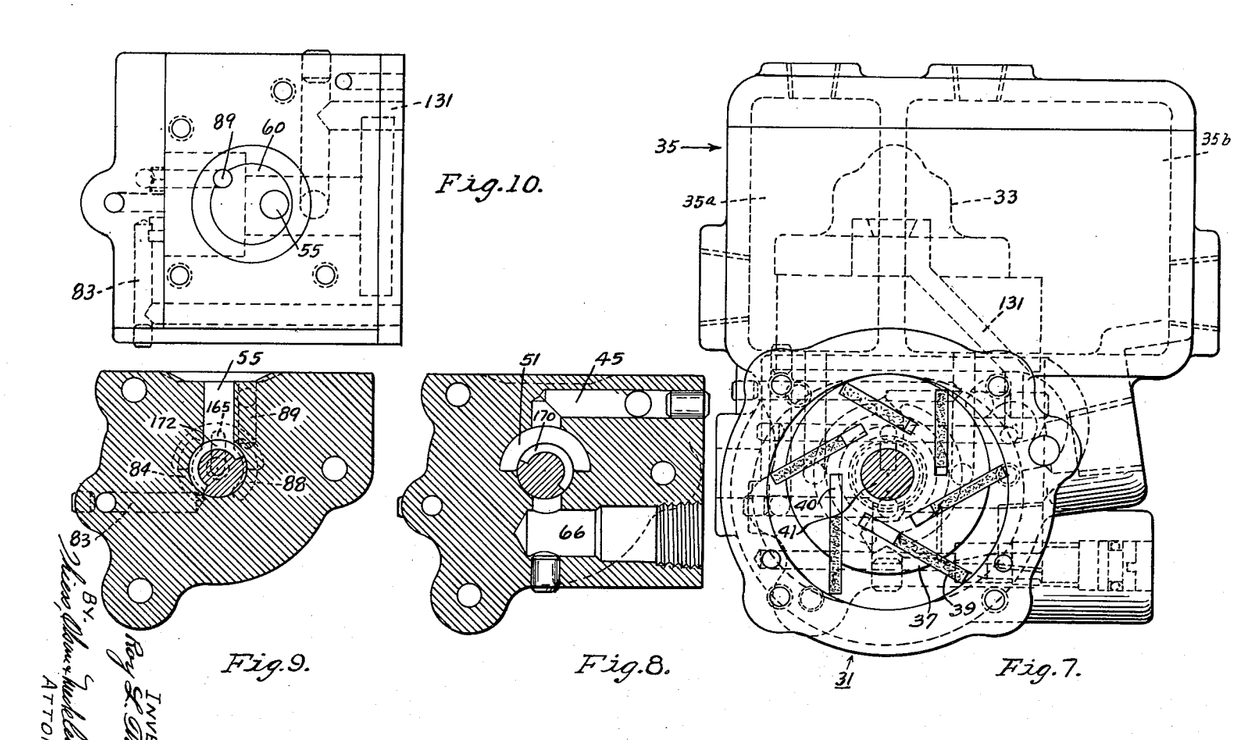
Fig. 7 is a cross-sectional view taken along the line 7—7 of Fig. 6.
Fig. 8 is a cross-sectional view taken along the line 8—8 of Fig. 6.
Fig. 9 is a cross-sectional view taken along the line 9—9 of Fig. 6.
Fig. 10 is a cross-sectional view taken along the line 10—10 of Fig. 6.

The embodiment of the invention disclosed in Fig. 2 is identical to that disclosed in Fig. 1 with the exception of the apparatus involved in the supply of secondary air. In this embodiment the relatively high pressure air from the pump 31 is employed to produce the required flow of secondary air, which latter may be of relatively low pressures but must be relatively large in quantity as compared to the flow of primary air.

It will be seen at the right-hand edge of Fig. 2 that the outlet conduit 45 of the pump 31 branches off in a conduit 150 which extends to the left in Fig. 2 and terminates in a nozzle 151. The high speed stream of air which is emitted by the nozzle 151 passes through a venturi tube 152 and down into the chamber 92, over the vanes 93 and into the burning chamber 34.

The upper end of the venturi tube 152 is open in the area surrounding the nozzle 151 to a chamber 153 which in turn is open to atmosphere. By virtue of the principles of operation of a venturi tube, as is well understood in the art, the high speed stream of air emanating from the nozzle 151 attracts a flow of air from the atmosphere through the chamber 153 and down the tube 152. The stream of air from the nozzle 151 though it is a relatively light stream in terms of cubic feet per minute, may, by virtue of its high speed, cause a much larger flow of air in terms of cubic feet per minute from the atmosphere through the tube 152. More specifically the total flow of air through the chamber 92 and into the burning chamber 34 may be many times the flow of air through the nozzle 151 in terms of cubic feet per minute.

The advantages of this arrangement for providing the flow of secondary air are twofold. The more obvious advantage is, of course, that a separate air pump is not required for supplying the secondary air, and, instead, a single, relatively high pressure pump 31, of somewhat larger capacity than the pump which would be required in the embodiment illustrated in Fig. 1, is required.

A second feature of this arrangement, which is obtained by its cooperation with the apparatus already described in connection with Fig. 1, is that a single adjustment may be employed to regulate the flow of primary air, the flow of secondary air and the flow of oil. Furthermore through the use of this single adjustment the flow of these three elements is varied substantially proportionately. More specifically, if more heat is required in the burning chamber 34 the single control apparatus may be adjusted to increase the flow of primary air, the flow of secondary air and the flow of oil, all by substantially the same ratio.

It has already been pointed out in the description of Fig. 1 that the control apparatus 100 may control the flow of primary air and of oil substantially proportionately. The same regulation of the output of the air pump 31 in Fig. 2 will cause a proportionately altered flow of air from the nozzle 151 which in turn will result in a proportionate change in the flow of air from the atmosphere through the chamber 153 and into the venturi tube 152. With this arrangement, when more or less heat is required, the flow of primary air, secondary air, and oil to the burning chamber 34 may be regulated either manually or automatically by a single control element and the mixture will inherently remain substantially constant.

In the initial adjustment of the apparatus, it is necessary that the desired proportionate flow of primary air, secondary air and oil be established. It has already been pointed out in connection with Fig. 1 that the control device 110 may be employed to establish the desired ratio of oil to primary air as fed to the burning chamber 34. The ratio of secondary air to primary air may be adjusted by means of a disk 154 which threadedly engages the outer cylindrical surface of the base of the nozzle 151. If it is desired to increase the ratio of secondary air to primary air the disk 154 is rotated in such a direction as to move it upwardly, thereby leaving a larger annular opening 155 through which air may pass into the venturi 152. Conversely if it is desired that the ratio of secondary air to primary air be made smaller, the disk 154 may be rotated in such a direction as to lower it, whereby the annular opening 155 and hence the flow of secondary air into the venturi are decreased. Once the disc 154 has been adjusted to give the proper ratio of flow of secondary air with respect to primary air, and hence with respect to oil, this ratio will remain substantially constant even though the flow of each of these three elements is varied over a wide range by the control device 100.

The various functions of the valve mechanism 32 have previously been explained, and its actual construction will now be described in detail. In Fig. 3 there is shown a cross section of the right-hand portion of the valve mechanism, this portion controlling the flow of oil from a remote fuel source, not shown in the drawings, to the receiver 35a. The port 132, which is connected to the expansible chamber 130 of the metering device, is shown in Fig. 3 as extending over an angle of 360 degrees. A radially extending opening 160 in the valve rotor 52 is arranged with one end being axially aligned with the port 132, and since the latter extends over an angle of 360 degrees the valve rotor opening 160 is always connected thereto. The port 133 which is connected to the main oil supply extends over an angle of slightly less than 180 degrees and is axially aligned with the outer end of the valve rotor opening 160. The port 134 which is connected to the receiver 35a also extends over an angle of slightly less than 180 degrees, as shown in Fig. 3. With this arrangement the valve rotor opening 160 causes the expansible chamber 130 of the metering device to be connected to the main oil supply during substantially one half of each cycle and to the receiver 35a during the alternate half of each cycle of operation. As indicated above the expansible chamber 130 is connected to the main oil supply during the downward stroke of the pistons 62 and 63 and to the receiver 35a during the upward stroke of the pistons 62 and 63.

The left-hand portion of the valve mechanism 32 as viewed in Figs. 1 and 2 is shown in cross section in Fig. 5. It will be noted therein that the two ports 84 and 88 extend over angles slightly less than 180 degrees at opposite sides of the axis of rotation of the rotor valve. The port 85 which leads to the expansible chamber 87 of the metering device is circular and is disposed at the center of rotation of the valve rotor. A valve rotor opening 165 is so arranged as to be connected at all times to the port 85 and to be alternately connected to the ports 84 and 88. When the port 85 is connected to the port 84 by the valve rotor opening 165 the receiver 35a is connected to the expansible chamber 87 of the metering device, and when the port 85 is connected to the port 88 by the valve rotor opening 165 the expansible chamber 87 of the metering device is connected to the expansible chamber 60 thereof. As previously indicated, the expansible chamber 87 is so connected to the chamber 60 during that portion of the cycle of operation when the pistons 62 and 63 are being raised, and to the receiver 35a when the pistons are moving downwardly.

In Fig. 4 there is shown a cross section of the central portion of the valve mechanism 32, this being the portion which controls the flow of primary air from the air pump 31 to the expansible chamber 60 of the metering device, and the flow of oil and primary air from the expansible chamber 60 to the float chamber 67. Referring to Fig. 4, it will be seen that the port 51 which is connected to the primary air pump extends over an angle of 180 degrees. Aligned with this port is a valve rotor opening 170 which extends over an angle of greater than 180 degrees and hence is always open to the port 51. The port 65 leading to the float chamber 67 is relatively small and accordingly, is cut off by the solid portion of the valve rotor during each revolution of the valve rotor. More specifically, it is cut off for approximately 90 degrees of each cycle as may best be seen by reference to Figs. 12 and 15.

To the left of the ports 51 and 65 as viewed in Figs. 1 and 2 is the port 54 connected to the expansible chamber 60 by the conduit 55. Aligned with this port is an opening 172 which may be seen in Fig. 4 and in Figs. 13, 16 and 19. As will be apparent upon inspection of the latter three figures the opening 172 is connected to the port 54 over an angle of 270 degrees of rotation of the valve rotor. In Figs. 1 and 2 it will be seen that the openings 170 and 172 in the valve rotor are interconnected and are in effect a single opening.

Figures 11, 12, 13, 14, 15, 16, 17, 18, 19, 20, 21, 22:
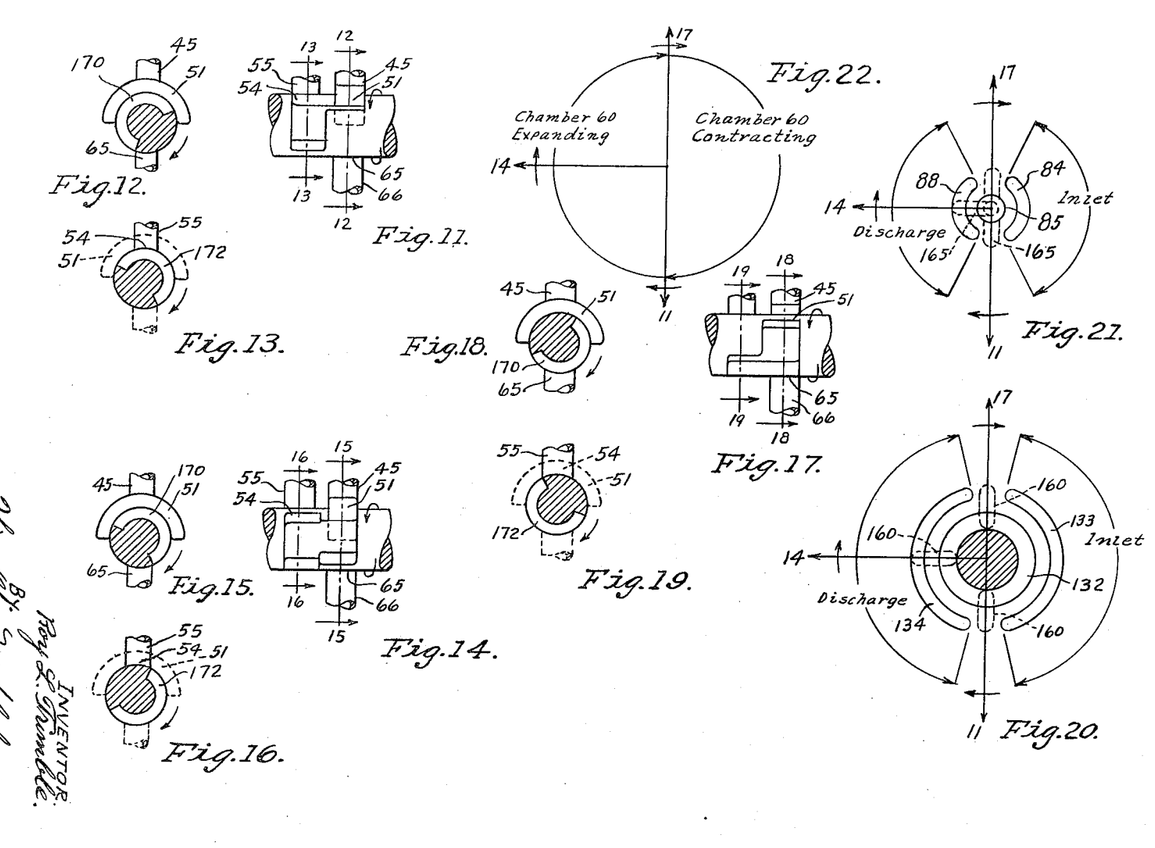
Fig. 11 is a partial view of a three-way valve disclosed in various of the preceding figures and taken in the same plane as Figs. 1, 2 and 6.
Fig. 12 is a cross-sectional view taken along the line 12—12 of Fig. 11.
Fig. 13 is a cross-sectional view taken along the line 13—13 of Fig. 11.
Fig. 14 is a view similar to Fig. 11 but showing the valve mechanism in a different operating position.
Fig. 15 is a cross-sectional view taken along the line 15—15 of Fig. 14.
Fig. 16 is a cross-sectional view taken along the line 16—16 of Fig. 14.
Fig. 17 is a view similar to Figs. 11 and 14 but showing the valve mechanism in a still different operating position.
Fig. 18 is a cross-sectional view taken along the line 18—18 of Fig. 17.
Fig. 19 is a cross-sectional view taken along the line 19—19 of Fig. 17.
Fig. 20 is a timing diagram for the valve apparatus seen best in Fig. 3.
Fig. 21 is a timing diagram of the valve mechanism seen best in Fig. 5.
Fig. 22 is a timing diagram for the valve mechanism seen in Figs. 4 and 11–19.

The sequence of operation of the various portions of the valve mechanism 32 can best be understood by reference to Figs. 11–22. In Figs. 11, 12 and 13 the central portion of the valve mechanism is shown in a position in which the port 51 leading to the air pump 31 is connected to the port 54 leading to the expansible chamber 60 of the metering device, while the port 65 leading to the float chamber 67 is closed. Under these conditions, the output of the primary air from the primary air pump enters the expansible chamber 60 of the metering device and drives the pistons 62 and 63 upwardly. This position of the valve rotor corresponds to the downwardly directed indicators 11 in the timing diagrams 20, 21 and 22.

In Fig. 20, which illustrates the timing of the right-hand valve portion, the valve rotor opening 160 is centered on the indicator 11. It will be apparent from inspection of Fig. 20 that the valve rotor opening 160 will be connected to the port 134 during the major portion of the ensuing 180 degrees of rotation of the valve rotor whereby oil may be expelled from the expansible chamber 130 toward the receiver 35a. The position of the valve rotor opening 165 illustrated in Fig. 21 also corresponds to the indicator 11, this figure illustrating the operation of the left-hand portion of the valve mechanism 32. It will be apparent upon inspection of Fig. 21 that during the major portion of the ensuing 180 degrees of rotation of the valve rotor, the valve rotor opening 165 will be connected to the port 88 whereby oil may be discharged from the expansible chamber 87 of the metering device to the expansible chamber 60 thereof.

A similar downwardly directed indicator 11 is also shown in Fig. 22 at the beginning of a phase termed therein "Chamber 60 Expanding." It will be noted that this condition also exists during the ensuing 180 degrees of rotation.

In Fig. 14 the central portion of the valve mechanism 32 is illustrated in the position assumed after the valve rotor has rotated through an angle of 90 degrees from the position illustrated in Fig. 11. It will be seen in Figs. 15 and 16 that the port 54 has just been cut off from the valve rotor opening 172 while the port 65 is just being connected to the valve rotor opening 170. Accordingly, for the next portion of the cycle, which will extend over approximately 90 degrees of rotation of the valve rotor, air from the pump 31 will pass directly from the port 51 to the port 65 and to the float chamber 67. During the same period the expansible chamber 60 is isolated. However, the air under pressure in the conduit 55 and in the chamber 60 will continue to force the diaphragm 61 and hence the pistons 62 and 63 upwardly as air is slowly expelled from the chamber 111 through the control device 110.

The beginning of this portion of the cycle corresponds to the indicator 14 in the timing diagrams, Figs. 20, 21 and 22. In Fig. 22, it will be seen that the valve is in the middle of the half cycle labelled "Chamber 60 Expanding." In Figs. 20 and 21 the valve rotor openings 160 and 165 are centered on the indicators 14. Accordingly, the left-hand portion of the valve mechanism still connects the expansible chamber 87 of the metering device to the expansible chamber 60 thereof while the right-hand portion of the valve mechanism 32 still connects the expansible chamber 130 of the metering device to the receiver 35a. These two connections are made to continue since the diaphragm 61 of the metering device, and hence the pistons 62 and 63, are still moving upwardly.

In Figs. 17, 18 and 19 the central portion of the valve mechanism 32 is shown in the position assumed after it has rotated 90 degrees from the position illustrated in Figs. 14, 15 and 16. In this position of the valve rotor the port 65 is still connected to the valve rotor opening 170 and the port 54 is just opening to the valve rotor opening 172. Accordingly, all three ports, namely, 51, 54 and 65, are connected, whereupon the primary air from port 51 passes directly to the port 65 and through the conduit 66 to the float chamber 67, and the oil and air contained in the expansible chamber 60 of the metering device is expelled by the spring 64 of the metering device through the port 54 into the port 65 and through the conduit 66 into the float chamber 67. This condition exists for 180 degrees of rotation of the valve rotor or until the valve rotor again reaches the position illustrated in Figs. 11, 12 and 13 wherein the port 65 is again closed.

The position of the valve rotor illustrated in Figs. 17, 18 and 19 corresponds to the indicators 17 in the timing diagrams 20, 21 and 22. In Fig. 22 it will be seen that the central portion of the valve is entering into a 180 degree phase labelled "Chamber 60 Contracting." As indicated immediately above, chamber 60 is contracting throughout this 180 degree portion of the cycle since the port 54 is connected to the port 65 throughout this period.

Referring to Fig. 20 it will be seen that the valve rotor opening 160, centered on the indicator 17 is about to connect the port 132, which leads to the expansible chamber 130 of the metering device, to the port 133 which leads to the main supply of fuel oil. This connection will continue for substantially the full 180 degree rotation of the valve rotor and since the pistons 62 and 63 of the metering device are moving downwardly during this portion of the cycle, oil will be drawn from the main oil supply toward the expansible chamber 130.

Referring to Fig. 21 it will be seen that the valve rotor opening 165 which is centered on the indicator 17 is about to connect the port 85, which leads to the expansible chamber 87 of the metering device, to the port 84 which leads to the receiver 35a. Accordingly, during the major portion of this half cycle oil will be drawn from the receiver 35a toward the expansible chamber 87 as the plunger 63 of the metering device descends.

Two embodiments of the invention now having been described in detail, it will be apparent that substantial advantages may result from the employment of the various cooperative features of the invention, either alone or in combination. The reciprocating metering device results in accurate metering of liquids, the flow readily being regulated by controlling the length of stroke. The arrangement of the metering device for pneumatic drive results in a greatly simplified construction, especially where a source of compressed air is readily available as in the illustrated embodiments of the invention.

Furthermore, the illustrated embodiments of the invention lend themselves to the provision of pumping means for drawing liquid from a remote source to the vicinity of the apparatus. The arrangements disclosed have the still further advantage that the ratio of fuel oil to primary air is readily adjustable, and the flow of each may be easily regulated without altering the ratio of oil to air.

In the embodiment of the invention illustrated in Fig. 2, one drive means, namely that normally employed for driving the secondary air pump, is eliminated, and the combined system provides that the flow of primary air, secondary air and oil may easily be regulated without altering the ratio of flow of these three elements.

While particular embodiments of the invention have been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. Apparatus for metering the flow of liquid fuel from a supply source to a burner, said apparatus comprising an air pump, a pneumatically driven reciprocating fuel metering pump actuatable by air from said air pump, and valve means driven with said air pump for controlling the flow of fuel to said metering pump and the flow of air from said air pump to said metering pump.

2. Apparatus for metering the flow of liquid fuel comprising a fuel supply source, a burner, an air pump for supplying primary air to said burner, a pneumatically driven reciprocating fuel metering pump actuatable by air from said air pump, a continuously driven valve mechanism for controlling the flow of fuel and of air from said source and from said air pump to said metering device and to said burner, said fuel metering pump having an expansible operating chamber for receiving air from said pump and an expansible fuel metering chamber for receiving fuel from said source, said valve mechanism cyclically connecting said operating chamber to said air pump and to said burner and cyclically connecting said fuel metering chamber to said source and to said operating chamber, said valve mechanism connecting said fuel metering chamber to said source when said operating chamber is connected to said burner and connecting said operating chamber to said fuel metering chamber and to said air pump simultaneously, and means powered by air from said air pump for supplying secondary air to said burner, said means including a nozzle for emitting a stream of air from said air pump, and a conduit surrounding said nozzle, said conduit leading, in the direction of flow of air from said nozzle, to said burner and being open to atmosphere to the rear of said nozzle, whereby secondary air may be drawn through said conduit by said stream.

3. Apparatus for metering the flow of liquid fuel comprising a fuel supply source, a burner, an air pump for supplying primary air to said burner, a pneumatically driven reciprocating fuel metering pump actuatable by air from said air pump, a continuously driven valve mechanism for controlling the flow of fuel and of air from said source and from said air pump to said metering device and to said burner, said fuel metering pump having an expansible operating chamber for receiving air from said pump and an expansible fuel metering chamber for receiving fuel from said source, said valve mechanism cyclically connecting said operating chamber to said air pump and to said burner and cyclically connecting said fuel metering chamber to said source and to said operating chamber, and means powered by air from said air pump for supplying secondary air to said burner, said means including a nozzle for emitting a stream of air from said air pump, and a conduit surrounding said nozzle, said conduit leading, in the direction of flow of air from said nozzle, to said burner and being open to atmosphere to the rear of said nozzle, whereby secondary air may be drawn through said conduit by said stream.

4. Apparatus for metering the flow of liquid fuel from a supply source to a burner and for supplying primary and secondary air to said burner, said apparatus comprising a burner unit, an air pump for supplying primary air to said burner, a pneumatically driven reciprocating fuel metering pump actuatable by air from said air pump, valve means driven with said air pump for controlling the flow of fuel to said metering pump and the flow of air from said air pump to said metering pump, and means powered by air from said air pump for supplying secondary air to said burner, said means including a nozzle for emitting a stream of air from said air pump, and a conduit surrounding said nozzle, said conduit leading, in the direction of flow of air from said nozzle, to said burner and being open to atmosphere to the rear of said nozzle, whereby secondary air may be drawn through said conduit by said stream.

5. Apparatus for metering the flow of liquid fuel from a supply source to a burner and for supplying primary and secondary air to said burner, said apparatus comprising a burner unit, an air pump for supplying primary air to said burner, a pneumatically driven reciprocating fuel metering pump actuatable by air from said air pump, and means powered by air from said air pump for supplying secondary air to said burner, said means including a nozzle for emitting a stream of air from said air pump, and a conduit surrounding said nozzle, said conduit leading, in the direction of flow of air from said nozzle, to said burner and being open to atmosphere to the rear of said nozzle, whereby secondary air may be drawn through said conduit by said stream.

6. Apparatus for metering the flow of liquid fuel from a supply source to a burner and for supplying primary and secondary air to said burner, said apparatus comprising a burner unit, an air pump for supplying primary air to said burner, a pneumatically driven reciprocating fuel metering pump actuatable by air from said air pump, means powered by air from said air pump for supplying secondary air to said burner, said means including a nozzle for emitting a stream of air from said air pump, and a conduit surrounding said nozzle, said conduit leading, in the direction of flow of air from said nozzle, to said burner and being open to atmosphere to the rear of said nozzle, whereby secondary air may be drawn through said conduit by said stream, and control means for regulating the output of said air pump as supplied to said burner and to said nozzle and said fuel metering pump, whereby the flow of fuel and of both primary and secondary air to said burner may be regulated by said control means.

7. Apparatus for metering the flow of liquid fuel from a supply source to a burner and for supplying primary and secondary air to said burner, said apparatus comprising a burner unit, an air pump for supplying primary air to said burner, a pneumatically driven reciprocating fuel metering pump actuatable by air from said air pump, means powered by air from said air pump for supplying secondary air to said burner, said means including a nozzle for emitting a stream of air from said air pump, and a conduit surrounding said nozzle, said conduit leading, in the direction of flow of air from said nozzle, to said burner and being open to atmosphere to the rear of said nozzle, whereby secondary air may be drawn through said conduit by said stream, control means for regulating the output of said air pump as supplied to said burner and to said nozzle and said fuel metering pump, whereby the flow of fuel and of both primary and secondary air to said burner may be regulated by said control means, and means for adjusting the opening of said conduit to atmosphere, thereby to regulate the flow of secondary air with respect to said stream of air emitted by said nozzle.

8. The combination comprising a receiver for liquid fuel, a utilization station, an air pump, a pneumatically driven reciprocating fuel metering pump actuatable by air from said air pump, and a continuously driven valve mechanism for controlling the flow of fuel and of air from said receiver and from said air pump to said metering pump and said utilization station, said fuel metering pump having an expansible operating chamber for receiving air from said air pump and an expansible fuel metering chamber for receiving fuel from said receiver, said valve mechanism cyclically connecting said operating chamber to said air pump and to said utilization station and cyclically connecting said fuel metering chamber to said receiver and to said operating chamber, said fuel metering pump having a third expansible chamber for pumping fuel from a source to said receiver, said valve mechanism cyclically connecting said third chamber to said source and to said receiver.

9. Apparatus for metering the flow of liquid fuel comprising a fuel supply source, a burner, an air pump, a pneumatically operated reciprocating fuel metering pump actuatable by air from said air pump, and a continuously driven valve mechanism for controlling the flow of fuel and of air from said source and from said air pump to said metering pump and to said burner, said fuel metering pump having an expansible operating chamber for receiving air from said air pump and an expansible fuel metering chamber for receiving fuel from said source, said valve mechanism cyclically connecting said operating chamber to said air pump and to said burner and cyclically connecting said fuel metering chamber to said source and to said operating chamber, and control means for regulating the stroke of said fuel metering pump whereby the ratio of fuel to air supplied to said burner may be regulated by said control means, said control means including a third expansible fuel metering pump chamber whose volume is an inverse function of the volume of said operating chamber, means for adjustably restricting outward flow of air from said third chamber, and means for permitting relatively unrestricted flow of air into said third chamber.

10. Apparatus for metering the flow of liquid fuel comprising a fuel source, a utilization station, an air pump for delivering air to said station, a pneumatically driven reciprocating fuel metering pump actuatable by air from said air pump, and regularly and cyclically operating valve means connected to said air pump and said metering pump, said valve means during each operating cycle connecting said air pump to said metering pump to actuate said metering pump to meter fuel and connecting said metering pump and said air pump to said utilization station to permit the flow thereto of air and of said metered fuel.

11. Apparatus for metering the flow of liquid fuel comprising a supply source, a utilization station, an air pump, a pneumatically operated reciprocating fuel metering pump actuatable by air from said air pump, and a regularly and cyclically operating valve mechanism for controlling the flow of fuel and of air from said source and from said air pump to said metering pump and to said utilization station, said fuel metering pump having an expansible operating chamber for receiving air from said pump and an expansible fuel metering chamber for receiving fuel from said source, said cyclically operating valve mechanism first connecting said operating chamber to said air pump and to said fuel metering chamber and subsequently connecting said fuel metering chamber to said fuel supply source and said utilization station to said operating chamber.

12. Apparatus for metering the flow of liquid fuel comprising a supply source, a utilization station, an air pump, a pneumatically operated reciprocating fuel metering pump actuatable by air from said air pump, and a regularly and cyclically operating valve mechanism for controlling the flow of fuel and of air from said source and from said air pump to said metering pump and to said utilization station, said fuel metering pump having an expansible operating chamber for receiving air from said pump and an expansible fuel metering chamber for receiving fuel from said source, said cyclically operating valve mechanism first connecting said operating chamber to said air pump and to said fuel metering chamber and subsequently connecting said fuel metering chamber to said fuel supply source and said utilization station to said operating chamber and to said air pump.

References Cited in the file of this patent

UNITED STATES PATENTS

| | | |
|---|---|---|
| 1,815,097 | Davidson | July 21, 1931 |
| 1,927,379 | Thomas | Sept. 19, 1933 |
| 2,128,721 | Watts | Aug. 30, 1938 |
| 2,163,436 | Raymond et al. | June 20, 1939 |
| 2,165,153 | Purdie | July 4, 1939 |
| 2,391,703 | Hughes | Dec. 25, 1945 |
| 2,484,920 | Witherell | Oct. 18, 1949 |

FOREIGN PATENTS

| | | |
|---|---|---|
| 40,234 | Sweden | Feb. 23, 1916 |
| 143,306 | Great Britain | May 18, 1920 |
| 330,177 | Germany | Dec. 10, 1920 |
| 635,504 | Germany | Sept. 18, 1936 |